United States Patent [19]
Tiphane

[11] Patent Number: 5,805,161
[45] Date of Patent: Sep. 8, 1998

[54] SYSTEM AND METHOD FOR DATA PROCESSING ENHANCED ERGONOMIC SCROLLING

[75] Inventor: Guy Tiphane, Atherton, Calif.

[73] Assignee: Logitech, Inc., Fremont, Calif.

[21] Appl. No.: 721,253

[22] Filed: Sep. 26, 1996

[51] Int. Cl.[6] .................................................. G06F 3/14
[52] U.S. Cl. .................... 345/341; 345/347; 345/339; 345/973; 345/123
[58] Field of Search .................................. 345/341, 340, 345/342, 339, 326, 347, 973, 974, 975, 121, 123, 124, 125, 352, 354

[56] References Cited

U.S. PATENT DOCUMENTS

| 5,122,785 | 6/1992 | Cooper | 345/163 |
|---|---|---|---|
| 5,339,391 | 8/1994 | Wroblewski et al. | 345/341 |
| 5,446,481 | 8/1995 | Gillick et al. | 345/163 |
| 5,479,600 | 12/1995 | Wroblewski et al. | 345/340 |
| 5,506,951 | 4/1996 | Ishikawa | 345/341 |
| 5,530,455 | 6/1996 | Gillick et al. | 345/163 |
| 5,581,670 | 12/1996 | Bier et al. | 345/326 |
| 5,655,094 | 8/1997 | Cline et al. | 345/341 |
| 5,680,561 | 10/1997 | Amro et al. | 345/341 |

OTHER PUBLICATIONS

Cowart, "Mastering Windows 3.1", Sybex Inc., pp. 21–24, 1993.

Soukoreff, W., and MacKenzie, Scott, "Generalized Fitts' Law Model Builder", http://www.cis.uoguelph.ca/~will/gflmb.manual.html, University of Guelph, Guelph Ontario Canada, downloaded 1996.

"Microsoft IntelliMouse", Product Advertisement, http://www.microsoft.com/products/hardware/intellimouse.htm., Microsoft Corporation, 1996.

Primary Examiner—Matthew M. Kim
Assistant Examiner—Crescelle N. dela Torre
Attorney, Agent, or Firm—Fenwick & West LLP

[57] ABSTRACT

A system to jump a pointer to a scroll box and lock the pointer to an elevator of the scroll box comprises a pointing device subsystem, a menu subsystem, a jump subsystem, and a lock subsystem. The pointing device subsystem is coupled to each of the menu subsystem, the jump subsystem, and the lock subsystem. In addition, the jump subsystem is coupled to the menu subsystem and the lock subsystem. The pointing device subsystem uses its pointer to select a button for horizontal or vertical scrolling from a pop-up box menu displayed by the menu subsystem. After the button is selected, the jump subsystem jumps the pointer from the button to an elevator bar of the selected scroll box. The lock subsystem locks the pointer to the elevator bar of the scroll box. The pointer may now be moved along the directions permitted by the scroll box so that the screens of the computer application scroll in such a direction. When a desired screen location is found through the scrolling function, the pointer is unlocked by the lock subsystem from the elevator bar. The present invention includes an ergonomic system for scrolling by automating the jump and lock of a pointer to an elevator bar in a scroll box. Further, the present invention includes a method for jumping and locking a pointer to an elevator bar in a scroll box.

12 Claims, 8 Drawing Sheets

SYSTEM AND METHOD FOR DATA PROCESSING ENHANCED ERGONOMIC SCROLLING

BACKGROUND OF THE INVENTION

1. Field of the Invention

The present invention is related to a data processing system and method and more specifically to a data processing system and method for ergonomic scrolling in a computer application.

2. Description of the Related Art

The use of a pointing device that controls a pointer for selecting an elevator bar of a vertical or a horizontal scroll box to respectively scroll a computer application in an up or down or a left or right direction on a computer screen is known. The pointing device is a conventional pointing device, such as a mouse, coupled to a computer.

In a conventional scrolling system, scrolling the computer application on the computer screen requires that a user first determine where the pointer is currently positioned on the screen. Then, the user must locate the scroll box and, more specifically, the elevator bar of the scroll box of the computer application. The user then guides the pointing device so that the pointer is positioned over the elevator bar of the scroll box. The user selects the elevator bar of the scroll box by depressing and holding in that depressed position a button on the pointing device so that the pointer is "locked" to the elevator bar. Keeping the first button of the pointing device depressed, the user moves the mouse button in a vertical or a horizontal direction, depending on which scroll box is selected, within a two dimensional plane such that the movement represents moving the screens of the computer application in an up or down or a left or right direction.

A problem with conventional scrolling systems and methods is that the user's attention must be redirected from a task previously focused on within the computer screen to focusing on locating and selecting the elevator bar of the scroll box to commence the scrolling function. Over time, continuing this process on the computer screen decreased the efficiency of a user because the user must redirect focus from one task to another. Another problem with prior art scrolling systems and methods is that the user may experience eye strain from constantly having to search around the computer screen to find the pointer, the scroll boxes, and the associated elevator bars of the scroll boxes.

Conventional scrolling systems and methods may also cause user discomfort or a decline in user accuracy and efficiency because of the fine motor movements and coordination required between a hand, fingers, and associated body components to locate the scroll box and the elevator, to select the elevator, and to exert pressure on a button of the pointing device while moving the controls of the pointing device with another component of the hand so that the computer screen moves in the direction specified.

Also known are conventional pop-up box menus which provide a set of buttons for manipulating a computer application that typically is accomplished using a standard bar menu associated with that computer application. Conventional pop-up box menus are called when a menu command is sought and the pop-up box menu disappears when not needed. These conventional pop-up menus place menu commands in a pop-up box format so that a user need not search each menu bar heading a particular command. A problem with such conventional pop-up menus is that selections must be recorded in a macro format and in some instances be scripted in a programming language such as BASIC. Recording or scripting menu selections to a pop-up box menu requires the need for additional computer system resources, beyond those already required to operate the pop-up box menu, such as additional storage device space and additional free random access memory ("RAM"). Moreover, conventional pop-up box menus merely place standard menu commands in a button format.

Therefore, there is a need for an ergonomic system and method for scrolling screens of a computer application that automatically locates and locks onto an elevator bar of a scroll box so that the screens of the computer application move as directed by a pointing device.

SUMMARY OF THE INVENTION

The present invention provides a system and method for having a pointer jump and lock onto a scroll box of a computer application, from a pop-up box menu within a computer application, so that screens of the computer application may be scrolled vertically or horizontally depending on the scroll direction chosen.

The system of the present invention includes a computer unit, a display unit, and a pointing device. The computer unit includes a central processing unit, a memory subsystem, a storage device subsystem, and a pointing device input/output subsystem, all of which are coupled to one another. The system of the present invention also includes a pointing device subsystem, a jump subsystem, a lock subsystem, and a menu subsystem.

The pointing device subsystem includes the pointing device and the pointing device input/output subsystem. The pointing device subsystem is coupled to the jump subsystem, the lock subsystem, and the menu subsystem. The jump subsystem is also coupled to the lock subsystem and the menu subsystem. The menu subsystem displays a pop-up menu that includes buttons for vertical scrolling and horizontal scrolling. The pointing device subsystem selects either vertical scrolling or horizontal scrolling once the pop-up menu is displayed. After a selection is made, the jump subsystem jumps the pointer from the selected button to the scroll box associated with the selected button. The lock subsystem then locks the pointer to the elevator bar of the selected scroll box.

A method of the claimed invention includes detecting a call for an application scroll box so that a user may scroll screens of a computer application. Once the call for the selected scroll box is detected, a pointer is jumped from a first location to an elevator button located within the scroll box. The pointer is locked to the elevator button and the pointer may be moved in directions associated with the selected scroll box.

The present invention offers a benefit of bringing the functions for vertical scrolling and horizontal scrolling immediately to the location of a pointer of a pointing device so that either scrolling function may be immediately selected. An advantage of the present invention is that a user can immediately jump and lock onto an elevator of the vertical or horizontal scroll box without having to search the screen to locate those elements, thereby reducing eye strain. Moreover, the present invention also offers an advantage of immediately jumping and locking onto the elevator button of a scroll box without having to carefully position the pointer through the pointing device to select and hold the elevator button of the scroll box, by minimizing fine motor movements of the hand, fingers, and associated body parts.

The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

Figure 1:
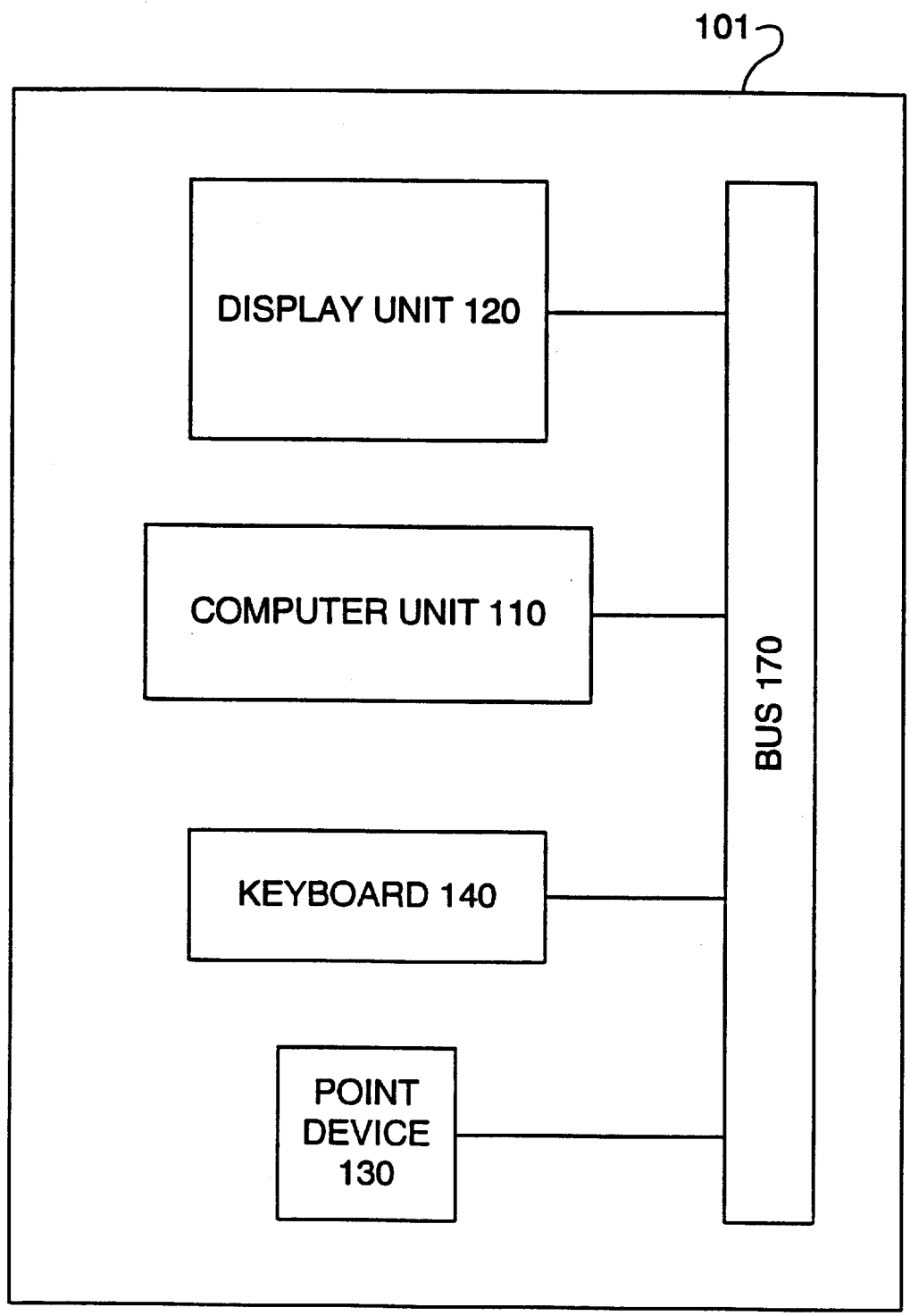
FIG. 1 is a block diagram illustrating a data processing system in accordance with the present invention.

The present invention includes a system and method for jumping and locking onto an elevator button of a scroll box when a user chooses to invoke a scrolling function. FIG. 1 is a block diagram illustrating a data processing system 101 in accordance with the present invention. The data processing system 101 includes a computer unit 110, a display unit 120, a pointing device 130, a keyboard 140, and a bus 170. The computer unit 110 is coupled to the display unit 120, the pointing device 130, and the keyboard 140 through the bus 170.

A user of the data processing system 101 interfaces with the computer unit 110 through, for example, the pointing device 130 and the keyboard 140. In a preferred embodiment the computer unit 110 is a conventional personal computer system, such as an IBM PC or compatible system, that includes a conventional operating environment, such as Microsoft Windows. The display unit 120 is a conventional display unit such as one that is video graphic array ("VGA") based and presents images on a display screen. The keyboard 140 is a conventional 101-key keyboard. The pointing device 130 is a three-button mouse that is commercially available from Logitech Inc. of Fremont, Calif. In an alternative embodiment, the pointing device may be another pointing device such as a trackball-type pointing device that is commercially available from Logitech Inc., a trackpoint-type pointing device that is commercially available from Lexmark International, Inc., of Lexington, Ky., or a two-button mouse that is commercially available from Logitech Inc. or Microsoft Corporation of Redmond, Wash.

The display unit 120 provides a visual presentation of inputs and outputs resulting from interaction between the keyboard 140 and/or the pointing device 130, and the computer unit 110. The computer unit 110 provides the data processing and logic to map movement from the pointing device 130 to the display unit 120 and to map keystrokes from the keyboard 140 to the display unit 120.

Figure 2:
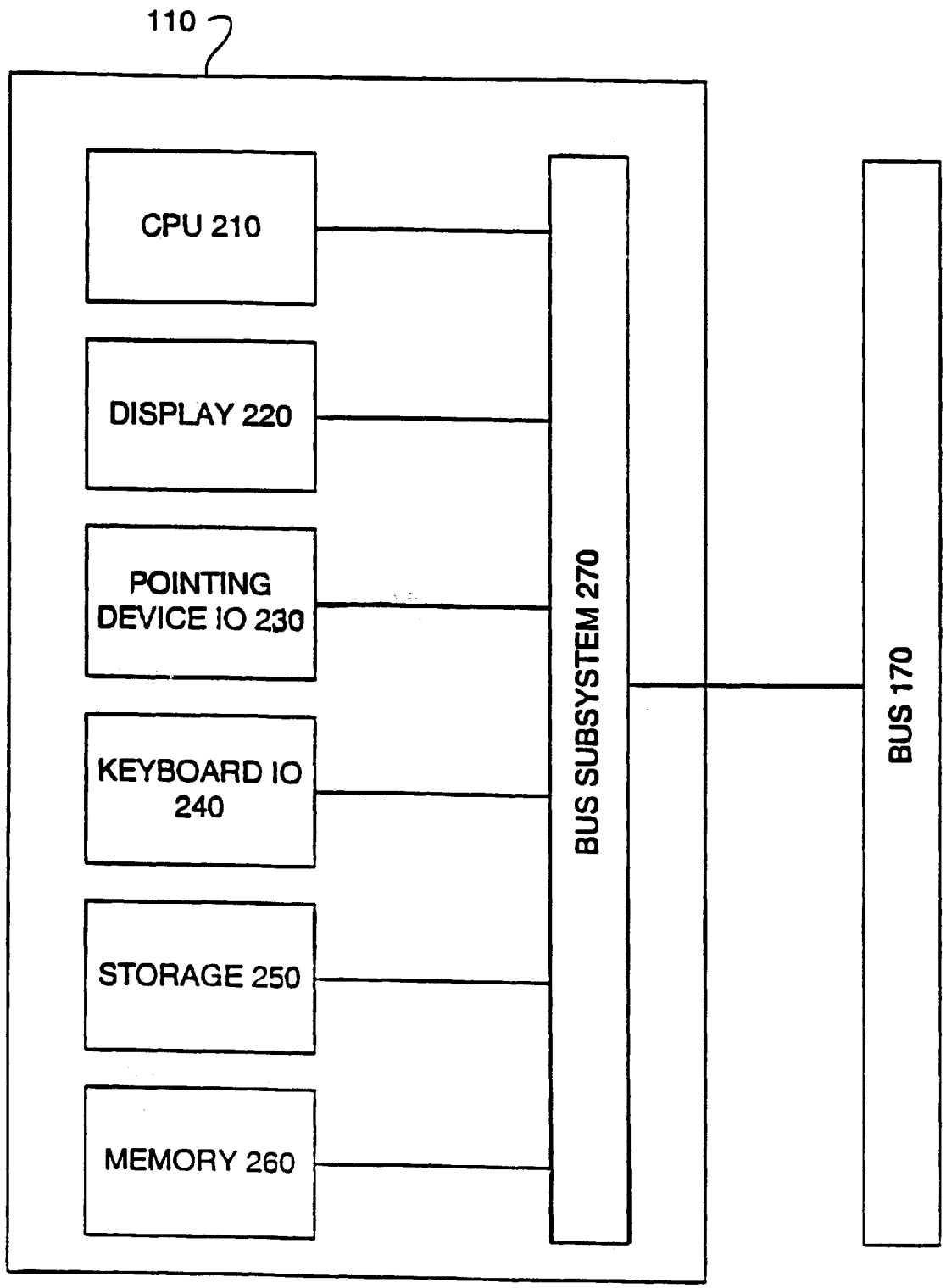
FIG. 2 is a block diagram illustrating a computer unit in accordance with the present invention.

FIG. 2 is a block diagram illustrating one embodiment of the computer unit 110. The computer unit 110 includes a central processing unit 210. In a preferred embodiment the central processing unit 210 is a conventional processing unit such as a Pentium™ microprocessor that is commercially available from Intel Corporation of Santa Clara, Calif. In alternative embodiments of the present invention the central processing unit may be a PowerPC processor that is commercially available from IBM Corporation of Armonk, N.Y., Apple Computer, Inc. of Cupertino, Calif., and Motorola, Inc. of Schaumburg, Ill., a SPARC processor that is commercially available from Sun Microsystems, Inc. of Mountain View, Calif, or an 80×86 microprocessor that is commercially available from Intel Corporation.

The computer unit 110 also includes a display unit input/output subsystem 220, a pointing device input/output subsystem 230, a keyboard input/output subsystem 240, a storage device subsystem 250, a memory subsystem 260, and a bus subsystem 170 all of which are conventional. The display unit input/output subsystem 220, the pointing device input/output subsystem 230, the keyboard input/output subsystem 240, the storage device subsystem 250, and the memory subsystem 260 are coupled to the central processing unit 210 through the bus subsystem 270. In addition, the display unit input/output subsystem 220 is coupled to the display unit 120, the pointing device input/output subsystem 230 is coupled to the pointing device 130, and the keyboard input/output subsystem 240 is coupled to the keyboard 140, all through the bus 170.

The central processing unit 210 processes input signals from the pointing device 130 that arrive through the pointing device input/output subsystem 230. The input signals from the pointing device 230 are associated with a position of a pointer on the display screen 120. The central processing unit translates the position coordinates from the pointing device 130 to a location on the display screen of the display unit 120. The central processing unit 210 forwards the location information to the display input/output subsystem 220, which transmits the signal to the display unit 120 for displaying the pointer location selected through the pointing device 130 onto the display screen.

Figure 3:
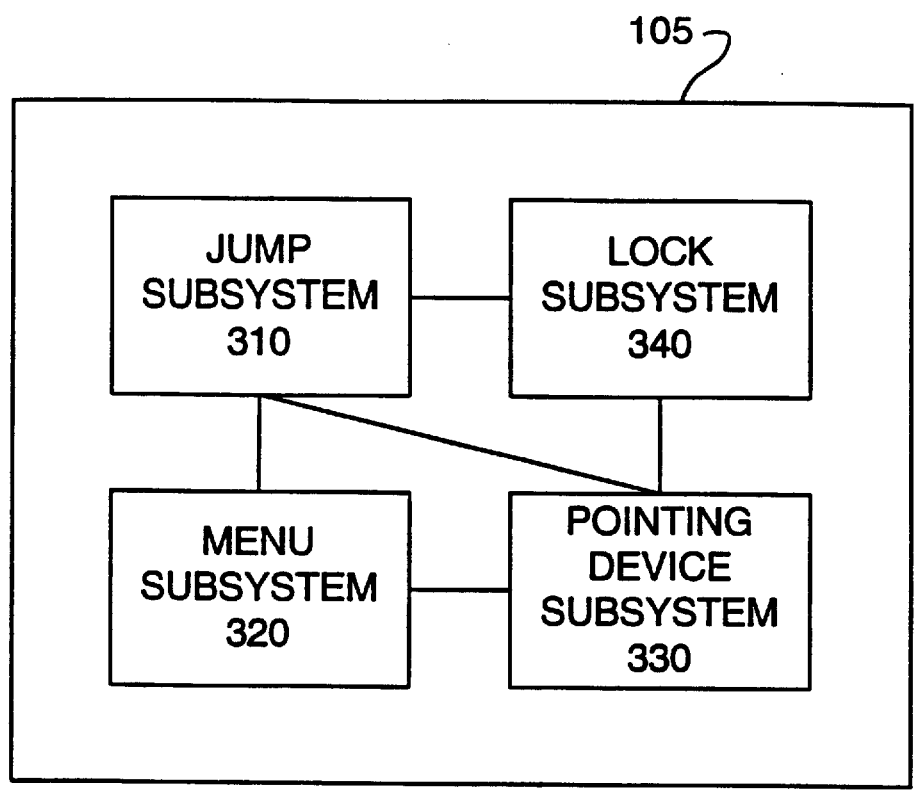
FIG. 3 is a block diagram illustrating a jump and lock subsystem in accordance with the present invention.

FIG. 3 is a block diagram illustrating a jump and lock subsystem 105 in accordance with the present invention. The jump and lock subsystem 105 resides on the storage device subsystem 250. At the start of the data processing system 101 operation, the jump and lock subsystem 105 is loaded into the memory 260 to achieve faster data interaction between the jump and lock subsystem 105 and the central processing unit 210. The jump and lock subsystem 105 includes a jump subsystem 310, a menu subsystem 320, a pointing device subsystem 330, and a lock subsystem 340. The pointing device subsystem 330 is coupled to the jump subsystem 310, the menu subsystem 320, and the lock subsystem 340. The jump subsystem 310 is also coupled to the menu subsystem 320 and the lock subsystem 340.

Figure 4A:
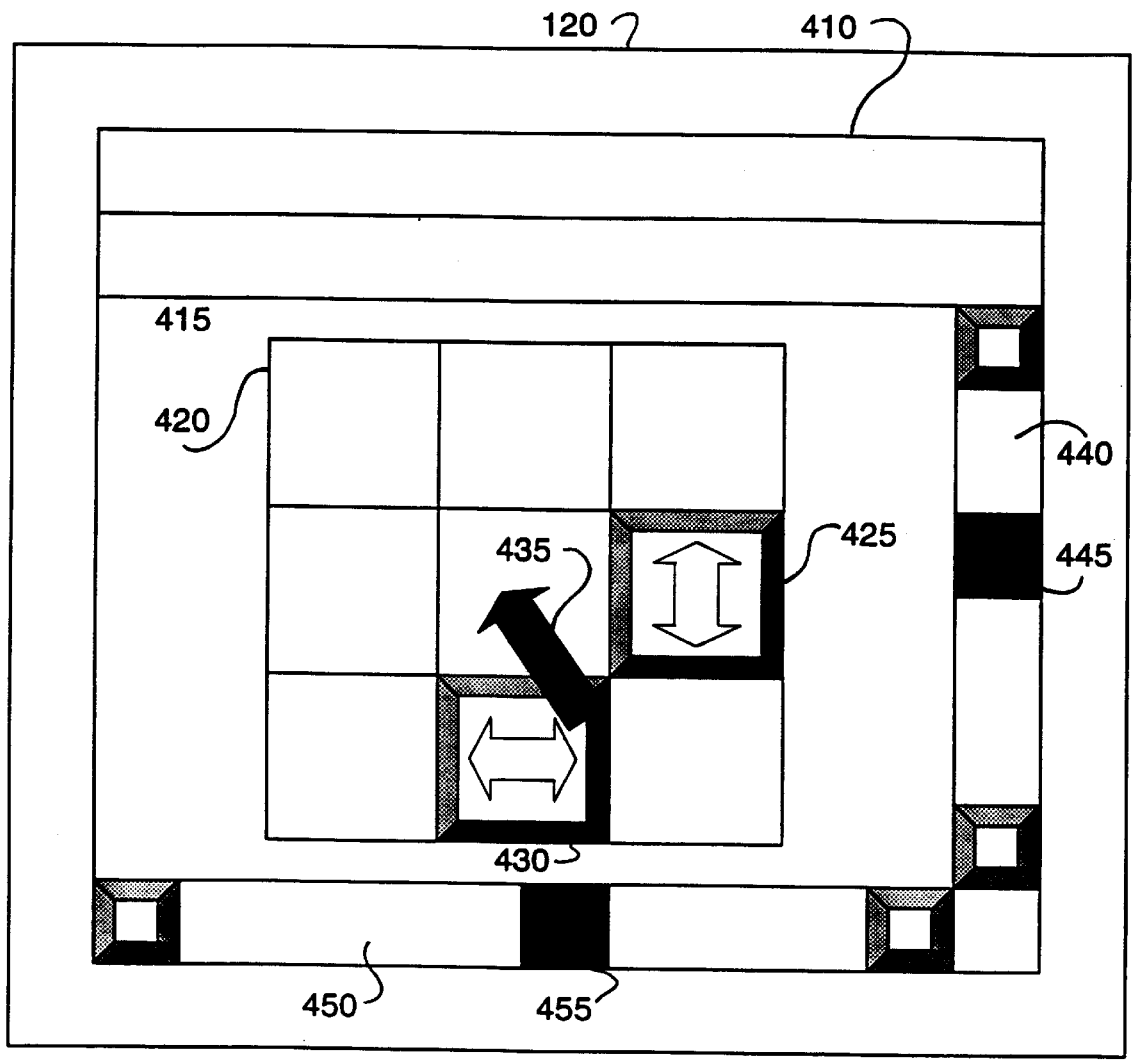
FIGS. 4A and 4B are diagrams illustrating a pop-up menu and selecting a button with a pointer for scrolling from the pop-up menu in accordance with the present invention.
Figure 4B:
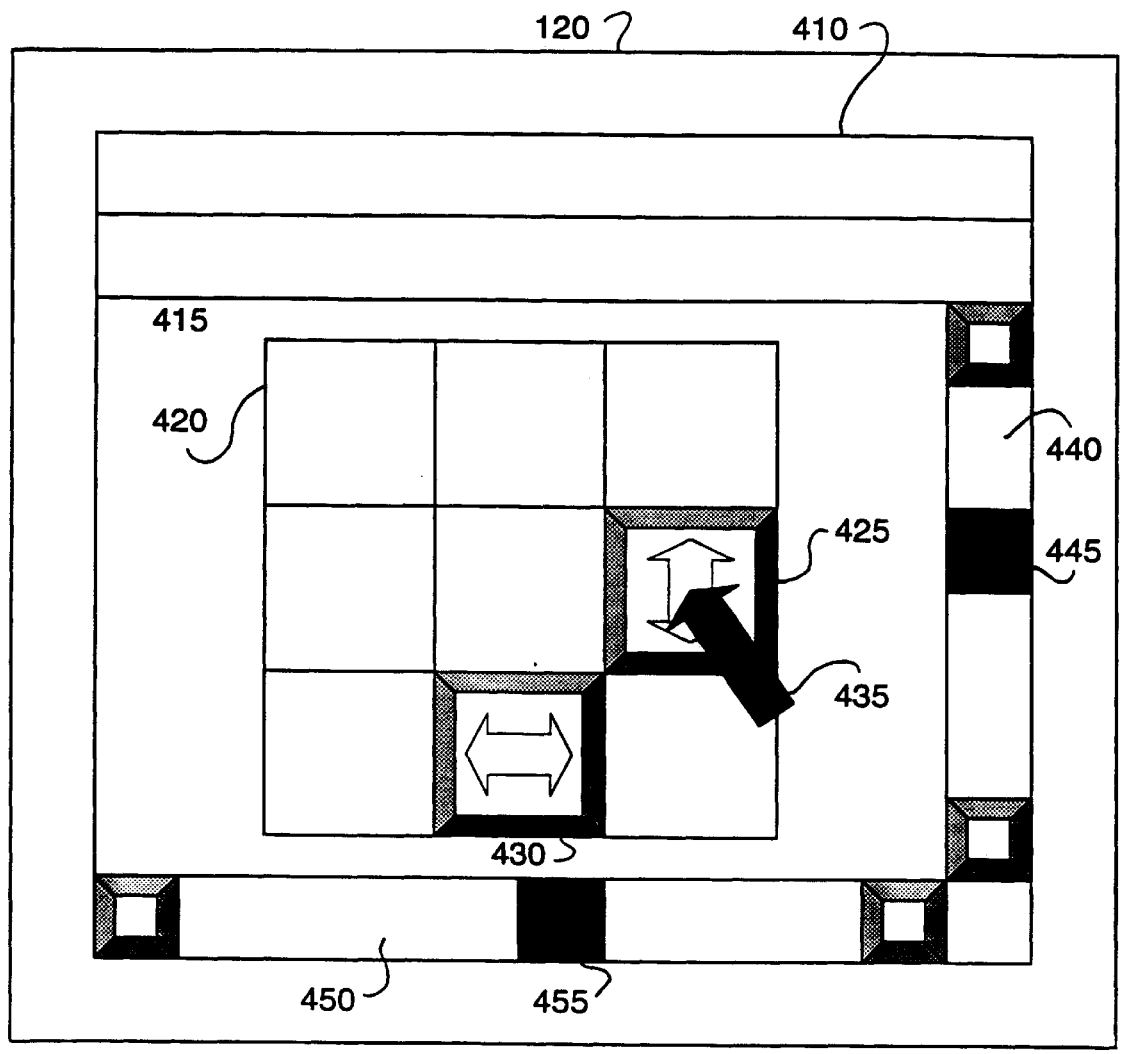
Figure 5:
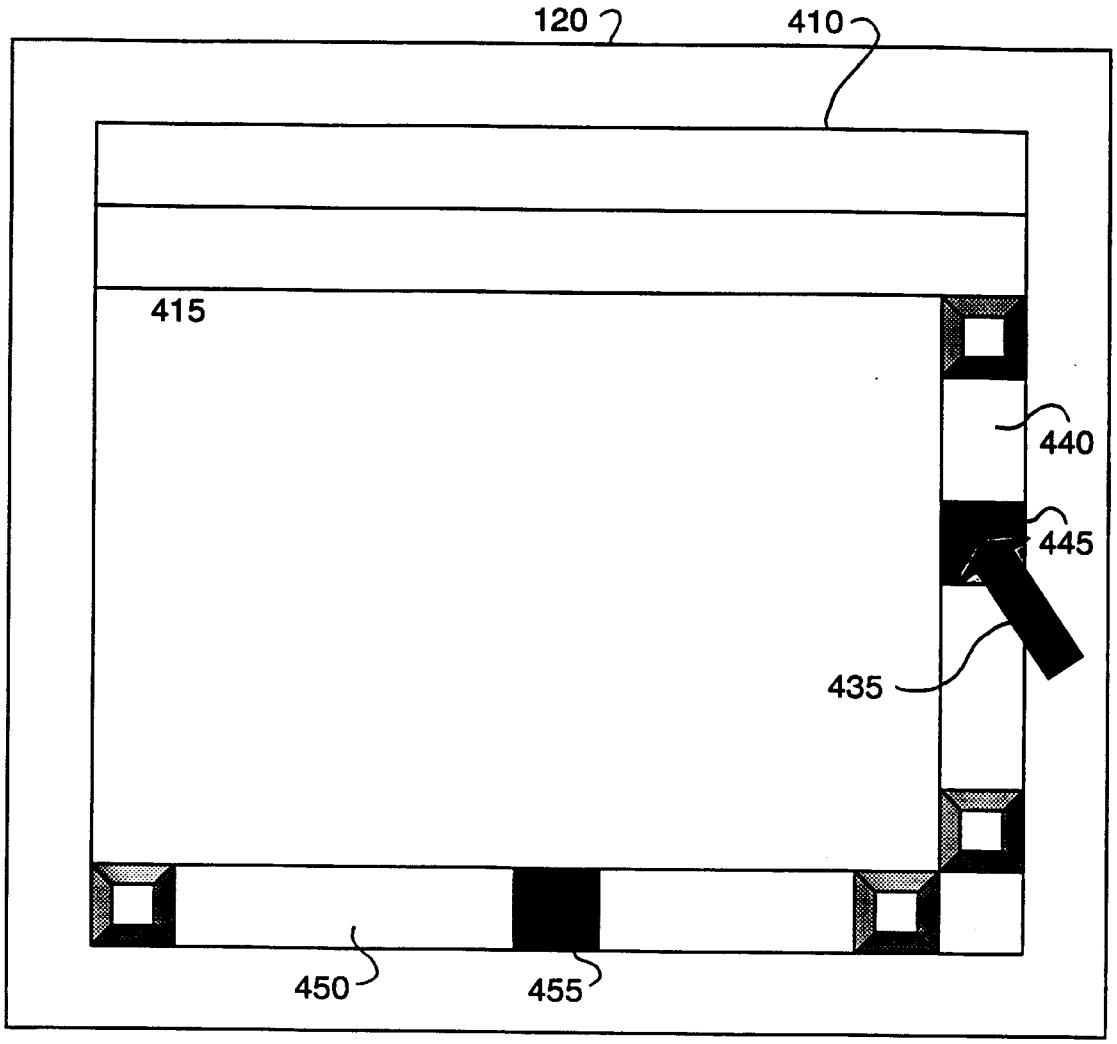
FIG. 5 is a diagram illustrating the pointer jumping and locking onto an elevator bar of a scroll box in accordance with the present invention.

The menu subsystem 320 provides a pop-up box menu for presentation on the display 120 and includes buttons for vertical scrolling or horizontal scrolling. The pointing device subsystem 330 includes the pointing device 130 and the pointing device input/output subsystem 230. The pointing device subsystem 330 also includes a button or other selection mechanism for calling the menu subsystem 320 and a pointer for selecting elements presented on the display 120. The jump subsystem 310 jumps a pointer from the selected button of the menu to a second location on the display screen of the display unit 120. The lock subsystem 340 locks the pointer to an element on the display at the second location on the display screen. FIGS. 4A and 4B and FIG. 5 are diagrams illustrating interaction of elements on the display screen of the display 120 in accordance with the present invention. The elements include a computer application display 410, one or more computer application screens 415 that are generated by the computer application, a pop-up box menu 420, a vertical scroll box 440, and a horizontal scroll box 450. The pop-up box menu has nine-buttons representing particular functions including a button for vertical scrolling 425 and a button for horizontal scrolling 430. The vertical scroll box 440 includes an elevator bar 445 for moving the application screens in an up or a down direction on the display 120. The horizontal scroll box 450 includes an elevator bar 455 for moving the application screens in a left or a right direction on the display 120.

When the user desires to perform a scrolling function within the computer application display 410 a button on the pointing device 130 is selected and depressed so that the pop-up box menu 420 is presented on the display 120 within the computer application display 410. In a preferred embodiment of the present invention the button that is selected and depressed is a middle button of a three-button mouse. In alternative embodiments of the present invention, the pop-up box menu may be displayed after selecting and depressing a second button on a two-button mouse or trackball-type device or selecting and depressing both buttons on a two-button mouse or trackball-type device.

In alternative embodiments, the menu itself may be an augmented Microsoft Windows menu that includes selections for scrolling, rather than the pop-up box menu. An augmented Windows menu may, for example, be a Windows 95 menu that is displayed on a computer screen when a user calls the Windows 95 menu using a button on the pointing device 130. The Windows 95 menu typically includes selections for launching applications, opening folders, or the like. The present invention may augment this menu by adding menu selections for the vertical scroll box 440 and the horizontal scroll box 450.

Keeping the middle button of the three-button point device 130 depressed so as to call the pop-up box menu 420, the pointing device subsystem 330 uses a pointer 435, illustrated in FIG. 4B, to move over the vertical scroll button 425 or the horizontal scroll button 430 before releasing the middle button to go to the selected scroll box 440, 450. For example, in FIG. 4B the pointing device 130 would be positioned so that the pointer 435 moves over the vertical scroll button 425 on the pop-up box menu 420. The middle button on the mouse is released to select the vertical scroll button 425. The selection of the vertical scroll button 425 is sent to the central processing unit 210 through the menu subsystem 320 in the memory 260.

After receiving the signal for selection of the vertical scroll button 425, the central processing unit 210 calls the jump subsystem 310 from the memory 260. The jump subsystem 310 repositions, or "jumps," the pointer 435 from the vertical scroll button 425 to the elevator bar 445 of the vertical scroll box 440 and transmits a signal through the central processing unit 210 to the menu subsystem 320 in the memory 260 indicating that the menu subsystem 320 should remove the pop-up box menu 420 from the display screen of the display 120.

FIG. 5 illustrates the computer application display 410 after the user selects the vertical scroll button 425. As described above, the pop-up box menu 420 is removed and the pointer 435 jumps over to the elevator bar 445 of the vertical scroll box 440 in response to a signal generated by the jump subsystem 310. Once the pointer 435 is jumped to the elevator bar 445 of the vertical scroll box 440 by the jump subsystem 310, the jump subsystem 310 signals the lock subsystem 340 to lock the pointer 435 to the elevator bar 445 of the vertical scroll box 440. The mechanism and process of locking the pointer 435 to the elevator bar 445 of the vertical scroll box 440 involves coupling the pointer 435 to the elevator bar 445, without requiring a button on the pointing device 130 to be continuously depressed, so that the pointer 435 and the elevator bar 445 may move together in unison.

The lock subsystem 340 automatically locks the pointer 435 to the elevator bar 445 of the vertical scroll box 440. The pointing device 120 may now direct the pointer 435 to move in an up or a down direction to move the application screens 415 in a corresponding up or down direction. Moreover, in a preferred embodiment, locking onto the elevator bar 445 of the vertical scroll box and moving the pointer 435 in an up or down direction is accomplished without having to keep a button on a mouse depressed throughout the process. When the application screen 415 is brought to a desired location through the scrolling process, the pointer is unlocked from the elevator bar 445 of the vertical scroll box 440 by clicking, or selecting and releasing for example, a first button on the three-button mouse or pointing device 130.

Although the above example was described with respect to the vertical scroll box, the same principles hold for the horizontal scroll box. The menu subsystem 320 is called to display the pop-up box menu 420 on the display 120 through selecting and holding a button on the pointing device 130. The horizontal scroll box button 430 is selected from the pop-up box menu 420 by moving the pointer 435 over the horizontal scroll button 430 and releasing the depressed button. The jump subsystem 310 jumps the pointer from the horizontal scroll box button 430 to the elevator button 455 of the horizontal scroll box 450 and signals the menu subsystem 420, through the central processing unit 210, to remove the pop-up box menu 420 from the display screen of the display 120.

The jump subsystem 310 signals the lock subsystem 340, through the central processing unit 210, that the jump has occurred and the lock subsystem 340 locks the pointer 435 to the elevator bar 455 of the horizontal scroll box 450. The pointer may now be moved through the pointing device in a left or a right direction thereby moving the application screens 415 in a corresponding left or right direction. When a desired location is found after scrolling, the pointer is released from the elevator bar 455 of the horizontal scroll box 450 by selecting and releasing, for example, a mouse button on the mouse or pointing device 130.

Figure 6A:
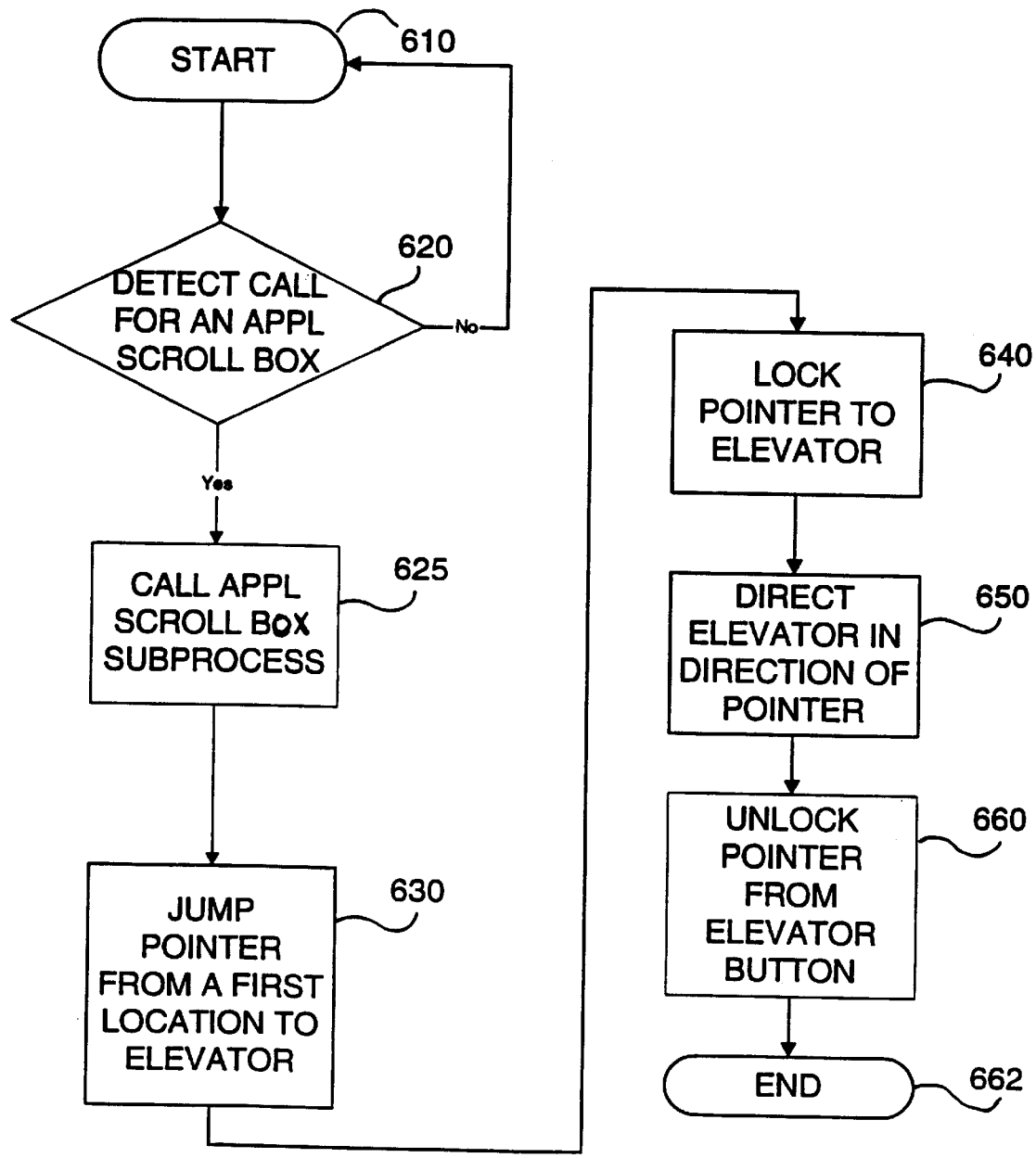
FIGS. 6A and 6B are flow diagrams illustrating a process for jumping and locking onto an elevator bar of a scroll box in accordance with the present invention.
Figure 6B:
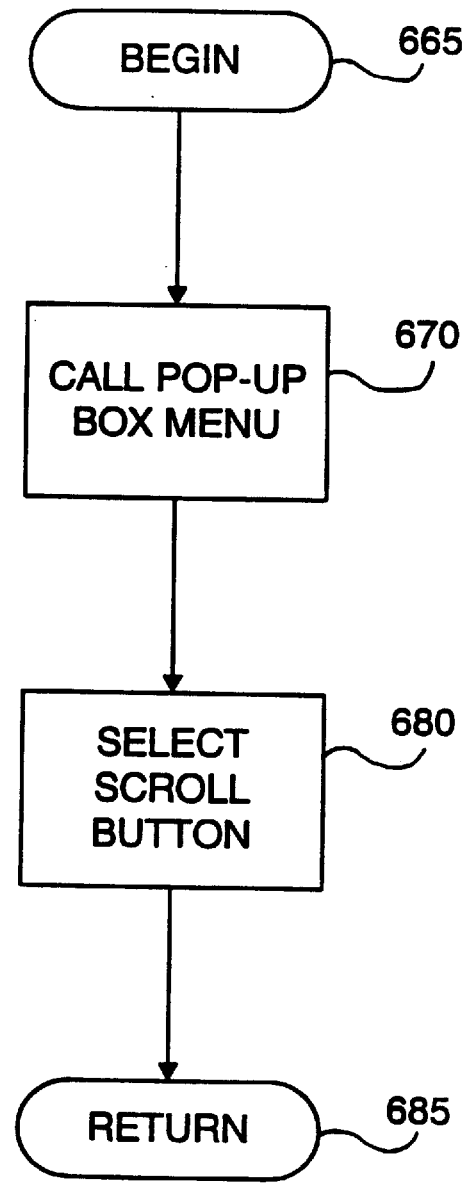

FIGS. 6A and 6B are flow diagrams illustrating a process for jumping and locking onto an elevator bar of a scroll box in accordance with the present invention. When the system 105 starts 610 operation, a call for an application scroll box is detected 620. In the preferred embodiment, the detection is an interrupt that occurs when the middle button of the three-button pointing device 130 is depressed. When the process starts 610, the process determines 620 whether there is a call for an application scroll box 440, 450. If the process determines 620 that no call for an application scroll box has been detected, the process loops back to start 610 again. If the process determines 620 that a call for an application scroll box has occurred, the application scroll box subprocess is called 625.

The process for calling 625 the application scroll box is shown in FIG. 6B. The call for the application scroll box is generated by the pointing subsystem 330, through the pointing device 130, signaling the menu subsystem 320 to call 670 the pop-up box menu 420 after beginning 665 the subprocess. Using the pointer 435 of the pointing device 130 a scroll button 425, 430 is selected 680. Returning 685 to FIG. 6A, the pointing device subsystem 330 signals the jump subsystem 310 in response to the selection 680 of the scroll button 445, 455.

The jump subsystem 330 jumps 630 the pointer 435 from a first location, i.e., from the selected scroll button 425, 430 to the elevator bar 445, 455 of the selected scroll box 440, 450. After jumping 630 the pointer 435 to the elevator bar 445, 455 or the selected scroll box 440, 450, the jump subsystem 310 signals the lock subsystem 340 to lock 640 the pointer 435 to the elevator bar 445, 455 of the selected scroll box 440, 450. The pointer 435 may now be moved in a desired direction such that the elevator bar 445, 455 is directed 650 in the desired direction and thereby moving the application screens accordingly in that desired direction. When the user completes the scrolling operation, a button on the pointing device 130 is selected and the pointing device subsystem 330 signals the lock subsystem 340 to unlock 660 the pointer 435 from the elevator bar 445, 455 of the selected scroll box 440, 450.

The present invention offers a benefit of jumping and locking onto an elevator bar 445, 455 of a scroll box 440, 450 of a computer application by calling a pop-up box menu 420, selecting with a pointer 435 a button 425, 430 for a scroll box 440, 450 from within the pop-up box menu 420, jumping the pointer 435 from the button 425, 430 to an elevator bar 445, 455 of the selected scroll box 440, 450, and then locking the pointer 435 to the elevator bar 445, 455. The present invention offers an advantage of increasing user efficiency by bringing the function of the scroll box 440, 450 to the user through the pop-up box menu 420 and scroll box selection button 425, 430 rather than having to coordinate the pointer 435 with the elevator bar 440, 450.

Another advantage of the present invention is that a user need not search the display screen 415 to locate the scroll box 445, 455 and more specifically the elevator bar 445, 455 within the scroll box 440, 450 thereby preventing eye strain. Further, an advantage of automatically jumping to and locking onto the elevator bar 445, 455 of the scroll box 440, 450 eliminates the need for finesse hand, finger, and associated body parts motions required to align and select an elevator bar with a pointer. Further, the present invention reduces fine motor movements of the hand, the fingers, and associated body parts that is associated with continuously holding a pointing device button in a depressed position. Thus, the present invention may increase overall user comfort.

The present invention offers a benefit of increased efficiency of moving the cursor to a small target at a distant location as modeled by Fitts' law. Fitts' Law models rapid, aimed, movements, where one appendage, e.g., a hand, starts at rest at a specific start position, and moves to rest once a target area is reached on the display screen. A target area may be, for example, an icon or an elevator bar on a display screen. Fitts' Law shows that it is more difficult to reach a small target the longer the distance to that target and smaller the objects, including the target, on the screen. In conventional pointing device schemes, the scroll bar is far from the center of a user's attention area, which is typically around the center of a screen. To reach the scroll bar the user must first visually locate the desired target, e.g., an elevator bar of a scroll box, and then make the appropriate hand and finger movements to select the target. Thus, the user expends greater time and energy to select the target. By contrast, the present invention allows the user to call up a pop-up box menu 420 at the center of the display screen of the display unit 120 move a short distance to the selection of a vertical scroll button 425 or horizontal scroll button 430 and automatically jump and lock onto the elevator 445, 455 of the vertical scroll box 440 or horizontal scroll box 450, based on the scroll button 425, 435 selected. The present invention, thereby, reduces movement time and energy to undertake a scroll function and reduces eye and appendage strain because concerns over screen distances and object sizes are reduced or eliminated.

In an alternative embodiment of the present invention, the jump and lock process of moving a pointer 435 to an elevator bar 445, 455 may be accomplished through a dedicated button on the pointing device 130, such as the middle button of a three-button mouse. In yet another embodiment of the present invention, the jump and lock process of moving a pointer 435 to an elevator bar 445, 455 of a scroll box 440, 450 may be accomplished through a rocker switch that is pushed or pressed in a first direction to jump and lock a pointer onto an elevator bar 445, 455 of a scroll box 440, 450 to scroll in a first direction or pushed or pressed in a second direction to jump and lock a pointer 435 onto an elevator bar 445, 455 of a scroll box 440, 450 to scroll in a second direction.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A system for scrolling a computer application display having a scroll box with an elevator bar, comprising:

a pointing device subsystem for controlling a pointer on the computer application display, the pointing device subsystem including a selection mechanism for receiving a selection input in response to selection by a user;

a menu subsystem, disposed to receive signals from the selection mechanism of the pointing device, for displaying a menu in response to the selection input, the menu including a scroll box selection;

a jump subsystem, disposed to receive a signal from the menu subsystem, for jumping the pointer from the scroll box selection to the elevator of the scroll box in response to de-selection of the selection mechanism by the user; and a lock subsystem, coupled to the elevator of the scroll box, for coupling the pointer to the elevator of the scroll box, the coupled elevator and pointer scrollable without further selection of the selection mechanism.

2. The system in claim 1, wherein the pointing device subsystem further comprises a mouse having a pointing device selection button.

3. The system in claim 2, wherein the selection mechanism is the pointing device selection button on the mouse and triggers the menu subsystem.

4. The system in claim 1, wherein the menu subsystem displays a pop-up box menu.

5. The system in claim 1, wherein the menu subsystem displays an augmented application environment menu.

6. The system in claim 1, wherein the pointing device comprises a pointer mechanism having a rocker switch, the rocker switch comprising the menu subsystem for selecting the scroll box in response to receiving a selection from a user.

7. A method for scrolling a computer application display having a scroll box with an elevator bar, comprising:

displaying a menu having the scroll box selection in response to depressing a selection mechanism of a selection device, the selection mechanism associated with a pointer;

detecting a call for the scroll box in response to placing the pointer over the scroll box selection and releasing the selection mechanism;

jumping the pointer from the scroll box selection to the elevator bar;

locking the pointer to the elevator bar; and directing the elevator bar to move in a specific direction in response to the pointer moving in the specific direction.

8. The method in claim 7, wherein the detecting step further comprises selecting the scroll box selection from the menu.

9. The method in claim 7, wherein the detecting step further comprises selecting a first button on a pointing device to call a menu having a scroll box selection.

10. The method in claim 7, further comprising unlocking the pointer from the elevator bar.

11. The method in claim 10, wherein the unlocking step further comprises selecting and releasing the selection mechanism.

12. A system for increasing comfort and minimizing fine motor movements for a user of a pointing device of a data processing system including a computer application display having a scroll box with an elevator bar, comprising:

a pointing device having a pointer and a selection mechanism;

a menu subsystem having a menu including a scroll box selection, the menu subsystem disposed to receive signals from the pointing device, the menu being displayed in response to a user depressing the selection mechanism, the pointer being aligned with the scroll box selection, the scroll box selection being selected by the user releasing the selection mechanism;

a jump subsystem, coupled to the menu subsystem and the pointing device, the jump subsystem for moving the pointer from the scroll box selection to the elevator bar of the scroll box in response to the user releasing the selection mechanism without the user moving the pointing device; and a lock subsystem, coupled to the jump subsystem and the pointing device, the lock subsystem for locking the pointer to the elevator bar of the scroll bar without the user depressing the selection mechanism while the pointer is aligned with the elevator bar.

* * * * *